United States Patent
Fukunaga (10) Patent No.: US 8,493,517 B2
(45) Date of Patent: Jul. 23, 2013

(54) OPTICAL COMPONENT ADJUSTMENT MECHANISM, LIQUID CRYSTAL DISPLAY AND PROJECTION DISPLAY

(75) Inventor: Hiroaki Fukunaga, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 990 days.

(21) Appl. No.: 12/448,104

(22) PCT Filed: Nov. 21, 2007

(86) PCT No.: PCT/JP2007/073000
§ 371 (c)(1),
(2), (4) Date: Sep. 3, 2009

(87) PCT Pub. No.: WO2008/072475
PCT Pub. Date: Jun. 19, 2008

(65) Prior Publication Data
US 2010/0079688 A1    Apr. 1, 2010

(30) Foreign Application Priority Data
Dec. 14, 2006 (JP) ................... 2006-336957

(51) Int. Cl.
*G02F 1/1335* (2006.01)
*G02F 1/1333* (2006.01)

(52) U.S. Cl.
USPC ................................. 349/8; 349/58

(58) Field of Classification Search
USPC .................................... 349/5–9, 58
See application file for complete search history.

(56) References Cited

U.S. PATENT DOCUMENTS

| | | | |
|---|---|---|---|
| 6,460,998 B1 | 10/2002 | Watanabe | |
| 6,556,266 B1 | 4/2003 | Shirochi et al. | |
| 7,086,745 B2 | 8/2006 | Watanabe et al. | |
| 2003/0179349 A1* | 9/2003 | Fukunaga et al. | 353/99 |
| 2005/0110962 A1 | 5/2005 | Watanabe et al. | |
| 2008/0043158 A1 | 2/2008 | Shirasaka et al. | |
| 2012/0013858 A1* | 1/2012 | Fukunaga et al. | 353/97 |

FOREIGN PATENT DOCUMENTS

| | | |
|---|---|---|
| EP | 1 077 387 A2 | 2/2001 |
| EP | 1 762 883 | 3/2007 |
| JP | 2000-259093 B1 | 9/2000 |
| JP | 2000-338478 | 12/2000 |
| JP | 2005-121880 A | 5/2005 |
| JP | 2006-011298 | 1/2006 |
| WO | 2006/001188 A1 | 1/2006 |
| WO | WO 2006/001188 A1 | 1/2006 |

OTHER PUBLICATIONS

Chinese Office Action dated Sep. 30, 2010, with English translation.
Japanese Office Action dated Feb. 29, 2012, with partial English translation.

* cited by examiner

*Primary Examiner* — Edward Glick
*Assistant Examiner* — David Chung
(74) *Attorney, Agent, or Firm* — McGinn Intellectual Property Law Group, PLLC (57) ABSTRACT

This optical component adjustment mechanism includes support frame 21 for supporting optical compensator 11, optical compensator support 20 having first and second rotary salients 22, 23 projecting outside from support frame 21 in a predetermined axis, holder support frame 31 for rotatably supporting first and second rotary salients 22, 23, setscrew 37 for fixing rotation of optical compensator support 20, and bracket 40.

19 Claims, 12 Drawing Sheets

OPTICAL COMPONENT ADJUSTMENT MECHANISM, LIQUID CRYSTAL DISPLAY AND PROJECTION DISPLAY

This application is based upon and claims the benefit of priority from Japanese patent application No. 2006-336957, filed on Dec. 14, 2006, the disclosure of which is incorporated herein in its entirety by reference.

TECHNICAL FIELD

The present invention relates to an optical component adjustment mechanism, a liquid crystal display, and a projection display, and especially, in a liquid crystal display using a vertically aligned liquid crystal element, to an optical component adjustment mechanism having a structure for improving contrast and color shading, a liquid crystal display including the optical component adjustment mechanism, and a projection display including the liquid crystal display.

BACKGROUND ART

In a liquid crystal display or a projection display using a liquid crystal element, a decrease in contrast and occurrence of color shading, due to characteristics of angle of visibility and phase retardation of the liquid crystal element, are well known. These degrade performance of a display. A display has an optical compensator that is an optical component to correct these.

In a liquid crystal display using a horizontally aligned liquid crystal element, an optical compensator is placed parallel to a liquid crystal display substrate. However, to correct optically, it is necessary to make the optical axis of the optical compensator coincide with the pretilt direction of a liquid crystal display element. Therefore, it is necessary to rotate the optical compensator in a surface thereof to adjust and fix it at a most suitable position.

On the one hand, Patent Document 1 (Japanese Patent Application Laid-Open No. 2000-259093) and Patent Document 2 (Japanese Patent Application Laid-Open No. 2000-338478) disclose technologies that, by rotating a polarizing plate in a surface thereof, the polarization axis of the polarizing plate coincides with the polarization direction of linear polarization. These technologies can be used to rotate the optical compensator in the surface thereof.

In the technology disclosed in Patent Document 1, a hole in a corner of a second frame for supporting a polarizing plate on the incident side is rotatably engaged with a salient portion projecting from a corner of a first frame fixed on a device main body. Then, rotating a screw provided in a corner opposite to the salient portion can adjust the angle of the polarizing plate on the incident side in the horizontal direction relative to a liquid crystal panel.

In the technology disclosed in Patent Document 2, a holder for supporting a glass plate to which a polarizing plate is adhered is rotatably supported by a member on the fixed side, and rotating the holder can adjust an angle of the polarizing plate on the incident side relative to the liquid crystal panel.

Besides a liquid crystal display using a liquid crystal panel including a horizontally aligned liquid crystal element such as a twisted nematic (TN) type, there is also a liquid crystal display (vertically-aligned-mode liquid crystal display) using a liquid crystal panel including a liquid crystal element having a vertically aligned liquid crystal element.

The vertically-aligned-mode liquid crystal display described above differs from a horizontally-aligned-mode liquid crystal display, as to an alignment of a liquid crystal. Therefore, both a characteristic of the angle of visibility and phase retardation of the liquid crystal element exhibit quite different characteristics from those of the horizontally-aligned-mode liquid crystal display. Accordingly, the vertically-aligned-mode liquid crystal display cannot use the methods for suppressing a decrease in contrast and occurrence of color shading by rotating the optical compensator in the horizontal direction, used in the horizontally-aligned-mode liquid crystal display.

Then, Patent Document 3 (Japanese Patent Application Laid-Open No. 2006-11298) discloses a technology for improving contrast by using an optical compensator that is a wave plate having optically negative uniaxiality (hereinafter, called "optical compensator for vertically-aligned-mode), to correct optically the vertically-aligned-mode liquid crystal display.

Figure 1:
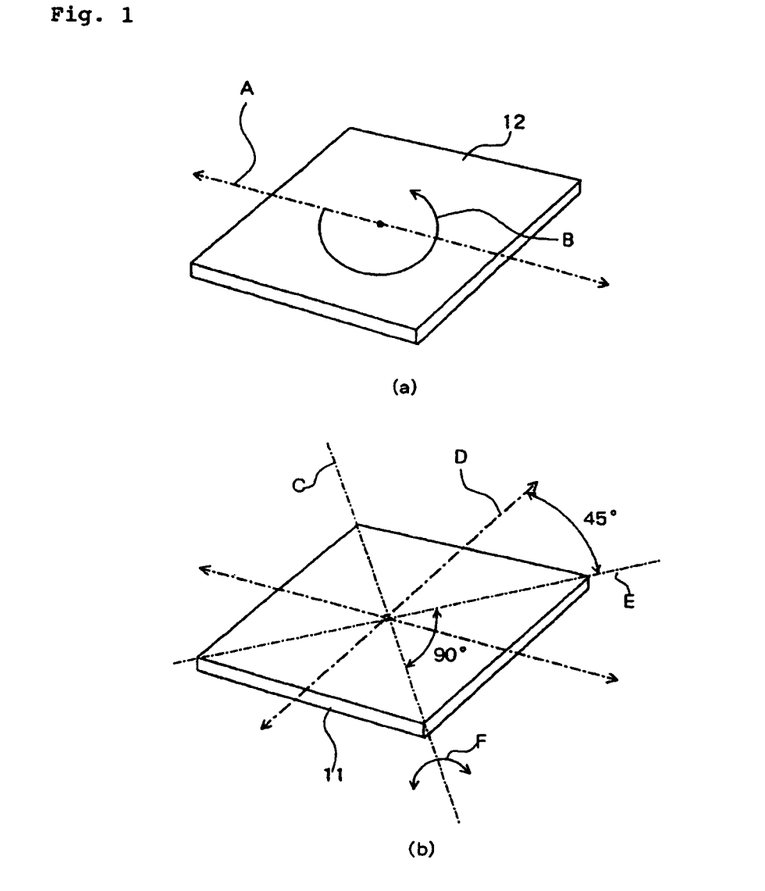
FIGS. 1(a), 1(b) show the principle for describing a difference in adjustment methods of an optical compensator corresponding to a liquid crystal panel in a horizontally-aligned-mode and a liquid crystal panel in a vertically-aligned-mode.

FIGS. 1(a), 1(b) show the principle for describing a difference in adjustment methods of an optical compensator corresponding to a liquid crystal panel in a horizontally-aligned-mode and a liquid crystal panel in a vertically-aligned-mode. FIG. 1(a) shows the case of the liquid crystal panel in a horizontally-aligned-mode, and FIG. 1(b) shows the case of the liquid crystal panel in a vertically-aligned-mode.

The liquid crystal panel in a horizontally-aligned-mode, as shown in FIG. 1(a), was adjusted by rotating optical axis A of optical compensator 12 in adjustment direction B in the same surface. On the one hand, in the liquid crystal panel in a vertically-aligned-mode, as shown in FIG. 1(b), optical axis C of optical compensator 11 for vertically-aligned-mode is positioned in the direction perpendicular to alignment direction E of liquid crystal molecules on a surface of a substrate of a vertically aligned liquid crystal element on the light incident side. Then, it is necessary to rotate optical compensator 11 for vertically-aligned-mode around optical axis C in adjustment direction F by an angle corresponding to a pretilt of liquid crystal molecules from a plane parallel to the liquid crystal panel.

As described above, the optical compensator for vertically-aligned-mode has to be placed so that a surface thereof is tilted to an incident surface of the vertically aligned liquid crystal element, which presents the problem that the adjustment mechanism of the optical compensator for horizontally-aligned-mode as disclosed in Patent Documents 1, 2 is not applicable. Further, the adjustment method disclosed in Patent Document 3 is mainly describes about a basic item and a specific configuration of the adjustment means is not sufficiently disclosed.

DISCLOSURE OF THE INVENTION

An example of an object of the present invention is to provide an optical component adjustment mechanism which can adjust an optical compensator for vertically-aligned-mode to position at a most suitable tilt to an incident surface of a vertically aligned liquid crystal element, and can support and fix the optical compensator in such a state.

Therefore, one aspect of the present invention is an optical component adjustment mechanism for rotatably supporting an optical component around a predetermined axis, the optical component adjustment mechanism including an optical component holder, a holder support frame and a fixing member for fixing rotation of the optical component holder. The optical component holder includes a support frame for supporting the optical component, a first rotary salient and a second rotary salient projecting outside from the support frame in a predetermined axis. The holder support frame rotatably supports the first and second rotary salients.

BRIEF DESCRIPTION OF THE DRAWINGS

FIG. 1(a) shows the case of the liquid crystal panel in a horizontally-aligned-mode, and FIG. 1(b) shows the case of the liquid crystal panel in a vertically-aligned-mode;

FIG. 2(a) shows a standard configuration and FIG. 2(b) shows an applied configuration;

BEST MODE FOR CARRYING OUT THE INVENTION

Now, an exemplary embodiment of the present invention will be described with reference to the accompanying drawings.

A wave plate having optically negative uniaxiality is used for an optical compensator for vertically-aligned-mode of the present exemplary embodiment corresponding to a liquid crystal panel in a vertically aligned mode. For that purpose, as shown in FIG. 1(b), optical axis C of optical compensator 11 for vertically-aligned-mode that is the wave plate having optically negative uniaxiality is placed in a direction perpendicular to alignment direction E of liquid crystal molecules that comprise a vertically aligned liquid crystal element. Then, it is necessary to place optical compensator 11 for vertically-aligned-mode in the approximately same direction of a pretilt direction of the liquid crystal molecules, by rotating optical compensator 11 around optical axis C from a plane parallel to the liquid crystal panel by an angle corresponding to the pretilt of the liquid crystal molecules.

In such a manner, by rotating optical compensator 11 for vertically-aligned-mode around optical axis C in adjustment direction F, the angle of tilt of optical compensator 11 for vertically-aligned-mode is adjusted. At this time, a support frame for supporting optical compensator 11 for vertically-aligned-mode, as a practical matter, is necessary, and a mechanism for rotating optical compensator 11 for vertically-aligned-mode with the support frame together is necessary.

Figure 2:
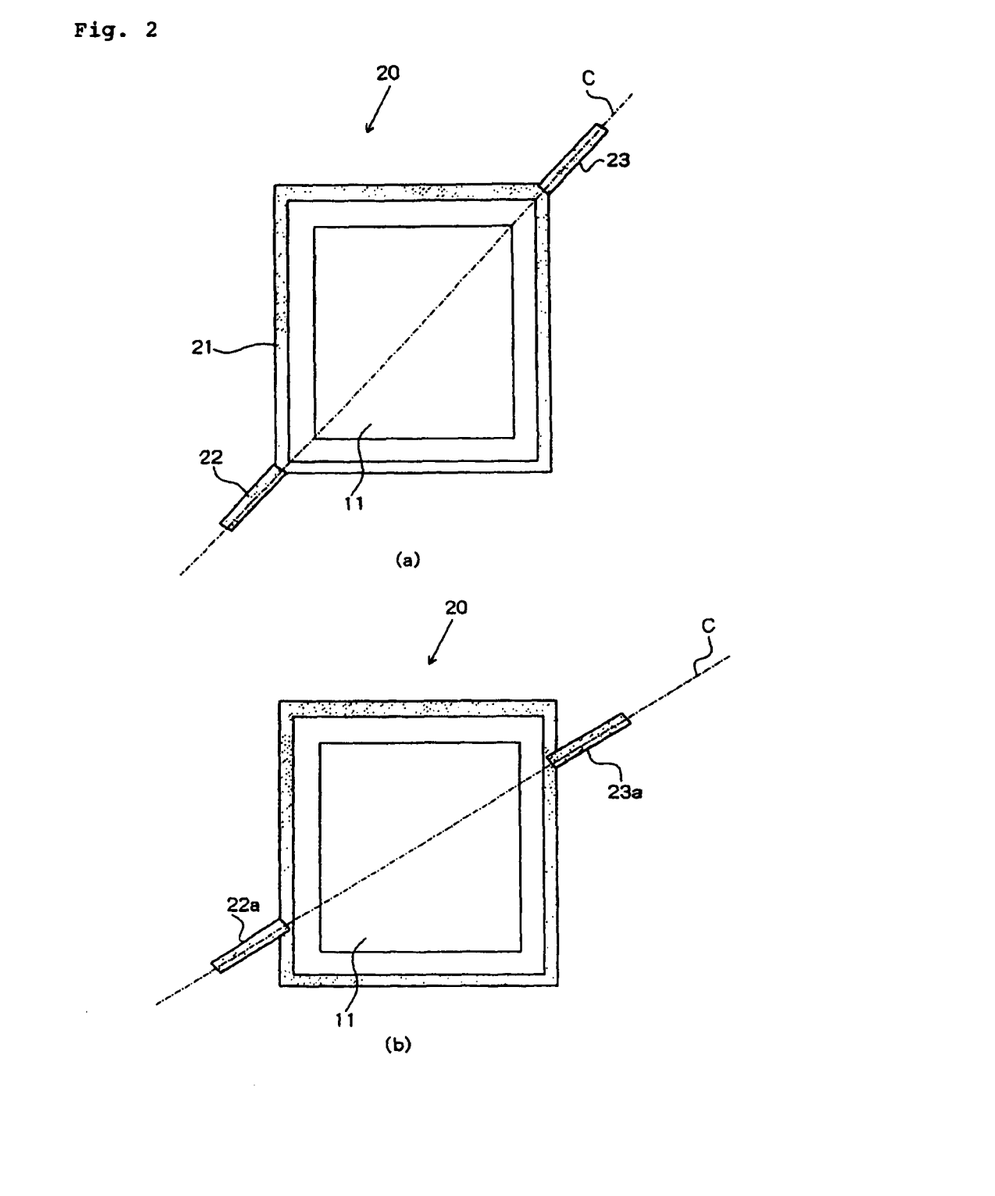
FIGS. 2(a), 2(b) are schematic, top views showing the relation between an optical compensator for vertically-aligned-mode, a optical compensator support frame and a rotary salient.

A component for supporting optical compensator 11 for vertically-aligned-mode will be described with reference to FIGS. 2(a), 2(b). FIG. 2(a) shows a standard aspect of an optical compensator support and FIG. 2(b) shows an applied aspect.

In the aspect of FIG. 2(a), optical compensator 11 for vertically-aligned-mode is mounted on optical compensator support 20. Here, optical axis C of optical compensator 11 for vertically-aligned-mode is placed to coincide with a diagonal line of optical compensator support 20.

On corners opposite to each other in the diagonal line of support frame 21 of optical compensator support 20, first rotary salient 22 and second rotary salient 23 centered on optical axis C of optical compensator 11 for vertically-aligned-mode are provided. Therefore, optical compensator support 20 can be rotated around first and second rotary salients 22, 23 as the rotation axis.

Further, when alignment direction E of the liquid crystal molecules on a surface of a substrate on the incident side of the vertically aligned liquid crystal element of the vertically-aligned-mode liquid crystal display is made perpendicular to optical axis C of optical compensator 11 for vertically-aligned-mode, there may be a case where optical axis C of optical compensator 11 for vertically-aligned-mode cannot coincide with the diagonal line of optical compensator support 20. In this case, first and second rotary salients 22, 23 do not necessarily have to be provided on the corners of optical compensator support frame 21. For example, as a center line that is a straight line in optical compensator 11 for vertically-aligned-mode perpendicular to alignment direction E of the liquid crystal molecules on the surface of the substrate on the incident side of the vertically aligned liquid crystal element of the vertically-aligned-mode liquid crystal display, first rotary salient 22a and second rotary salient 23a may be provided on sides of support frame 21 (FIG. 2(b)). Also in this case, the center line passes through the central point of optical compensator 11 for vertically-aligned-mode, and the exemplary embodiment of FIG. 2(a) may be applicable.

However, in this case, the hold mechanism of the rotary salients is complex, and therefore the configuration of FIG. 2(a) is desirable. Hereinafter, the configuration of FIG. 2(a) in which first and second rotary salients 22, 23 are provided on the corners of support frame 21 of optical compensator support 20 will be described as an example.

FIGS. 3(a), 3(b) show a configuration of optical compensator support 20 of the present exemplary embodiment.

Optical compensator support 20 has a structure for supporting and fixing optical compensator 11 for vertically-aligned-mode, and includes window frame-like support frame 21 for surrounding optical compensator 11 for vertically-aligned-mode. Optical compensator 11 for vertically-aligned-mode is inserted into support frame 21 of optical compensator support 20 from the front side in FIG. 3(a), pressed against first mounting portion 24 and second mounting portion 25 situated on the left and right sides of optical compensator support 20, and then clipped by upper fixing hook 26 and lower fixing hook 27. That is, optical compensator 11 for vertically-aligned-mode is fixed on optical compensator support 20 by mounting portions 24, 25 and upper and lower fixing hooks 26, 27.

On support frame 21 of optical compensator support 20, first rotary salient 22 is provided under first mounting portion 24 and second rotary salient 23 is provided over second mounting portion 25. First and second rotary salients 22, 23 are situated in an extension of the diagonal line of support frame 21 whose center line passes through the central point of optical compensator 11 for vertically-aligned-mode. First and second rotary salients 22, 23 have a cylindrical shape to facilitate rotation of support frame 21 around first and second rotary salients 22, 23 as the center of rotation.

On optical compensator support 20, fixing arm 28 is provided to fix optical compensator support 20 at a most suitable position after angle adjustment of optical compensator 11. Specifically, fixing arm 28 having sliding surface 28*a* and elongated hole 28*b* are provided on an end portion opposite to first rotary salient 22, of support frame 21 on the side of first mounting portion 23. Sliding surface 28*a* is provided to coincide with a plane perpendicular to an axis line that connects between first rotary salient 22 and second rotary salient 23. The center line of elongated hole 28*b* is situated on a radius centered on the axis line that connects between first rotary salient 22 and second rotary salient 23.

Next, referring to FIGS. 4 to 9, a configuration of projection display 1 having the optical component adjustment mechanism of the present exemplary embodiment and a method for mounting optical compensator support 20 on a liquid crystal display of a projection display main body will be described. Here, a three-plate projection display that displays an image on a liquid crystal panel every colors to optically compose an image will be described as an example, but the description may be similarly applicable to a single-plate projection display that displays an image of a different color on a liquid crystal panel in a time-sharing mode. That is, the present invention is not limited to the projection display, but is widely applicable to any apparatus using a liquid crystal display.

Figure 4:
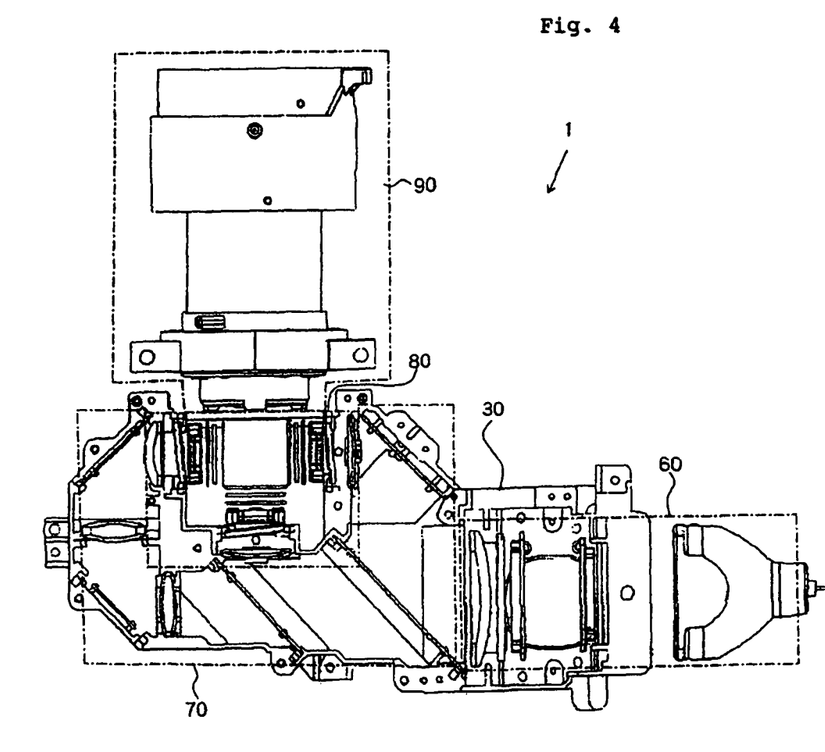
FIG. 4 is a top, partially exploded view of an illumination optical system, a color separation optical system, a color composition optical system and a projection optical system in a projection display of an exemplary embodiment.

An optical system of projection display 1, as shown in FIG. 4, includes four blocks: illumination optical system 60, color separation optical system 70, color composition optical system 80, and projection optical system 90. A part of illumination optical system 60, color separation optical system 70 and color composition optical system 80 are contained in optical engine base 30.

Figure 5:
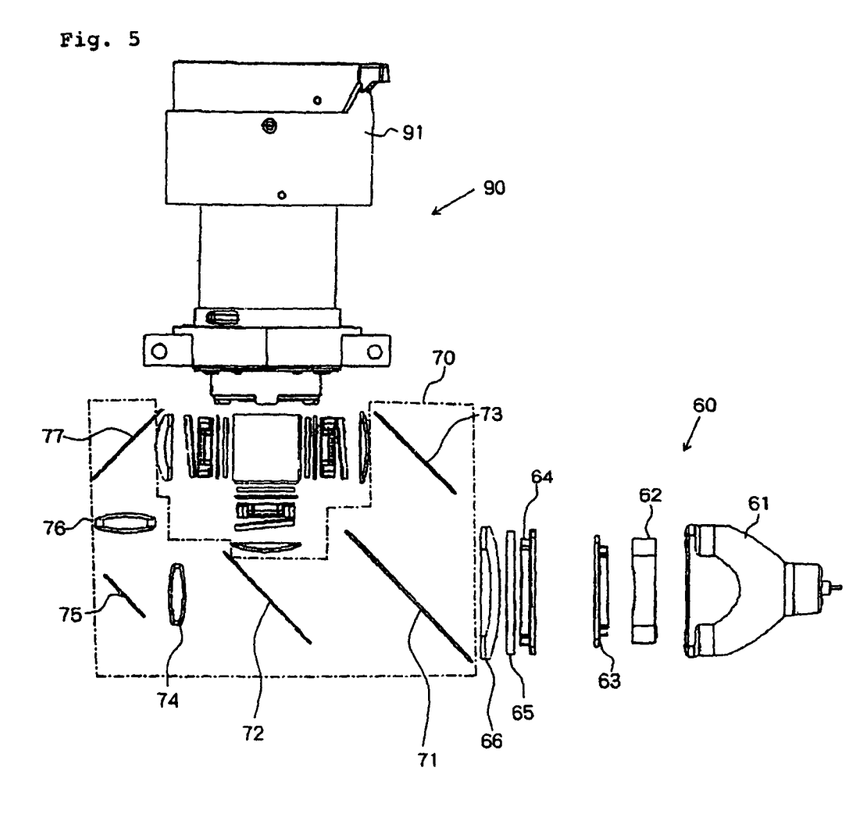
FIG. 5 is a top, schematic view for describing the functions of the optical systems in FIG. 4.

Illumination optical system 60, as shown in FIG. 5, includes lamp 61 including a light source and an elliptical reflector, concave lens 62, first integrator 63 and second integrator 64 for collimating an outgoing beam, flat polarizing beam splitter (PBS) 65 and field lens 66.

A non-polarized light flux that was emitted by lamp 61 and collimated by first and second integrators 63, 64 is formed in a linearly polarized light beam by flat PBS 65. Subsequently, the linearly polarized light beam, through color separation optical system 70, is incident on B liquid crystal panel 84B in a vertically-aligned-mode, G liquid crystal panel 84G in a vertically-aligned-mode and R liquid crystal panel 84R in a vertically-aligned-mode in color composition optical system 80 (see FIG. 6).

Color separation optical system 70 following illumination optical system 60, as shown in FIG. 5, includes optical systems for separating the total light flux from illumination optical system 60 into individual color light fluxes composed of red (R), green (G) and blue (B) and making the separated fluxes incident on a liquid crystal panel corresponding to individual colors. Specifically, color separation optical system 70 includes first dichroic mirror 71, second dichroic mirror 72, first reflecting mirror 73, second reflecting mirror 75, third reflecting mirror 77, first relay lens 74 and second relay lens 76.

Figure 6:
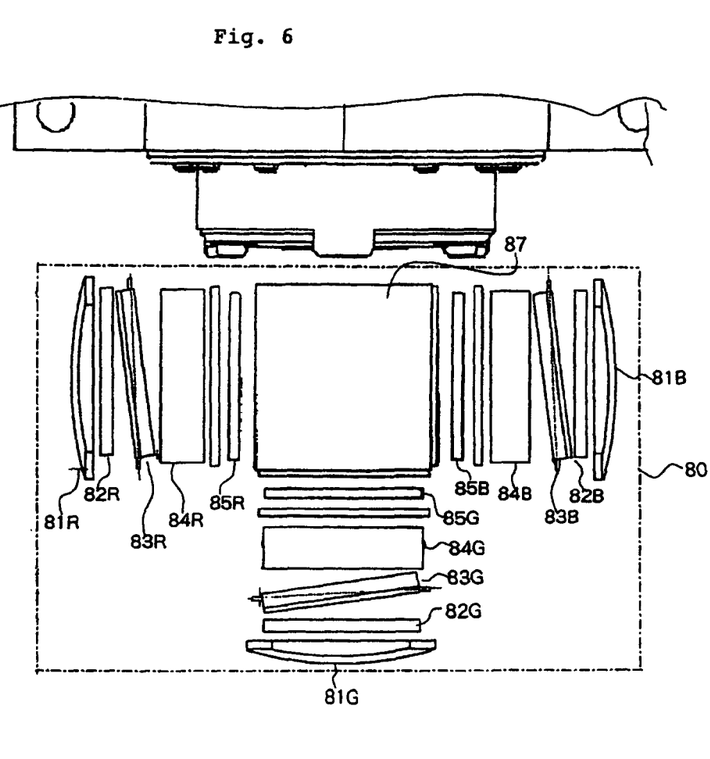
FIG. 6 is a top, exploded and schematic view of the color composition optical system.

Color composition optical system 80 following color separation optical system 70, as shown in FIG. 6, includes B liquid crystal panel 84B in a vertically-aligned-mode, G liquid crystal panel 84G in a vertically-aligned-mode and R liquid crystal panel 84R in a vertically-aligned-mode for modulating the individual color fluxes incoming from color separation optical system 70 according to given image data. Optical system 80 further includes B condenser lens 81B, G condenser lens 81G and R condenser lens 81R for condensing incident light beams on respective liquid crystal portions, B polarizing plate 82B on the incident side, G polarizing plate 82G on the incident side and R polarizing plate 82R on the incident side, B optical compensator 83B, G optical compensator 83G and R optical compensator 83R. Further, optical system 80 includes B polarizing plate 85B on the outgoing side, G polarizing plate 85G on the outgoing side and R polarizing plate 85R on the outgoing side, and color composition prism (XDP) 87 for composing modulated color light fluxes.

Projection optical system 90 following color composition optical system 80 includes projection lens 91, and projects composed light of B, G and R composed by color composition prism 87 on a screen not shown.

Figure 7:
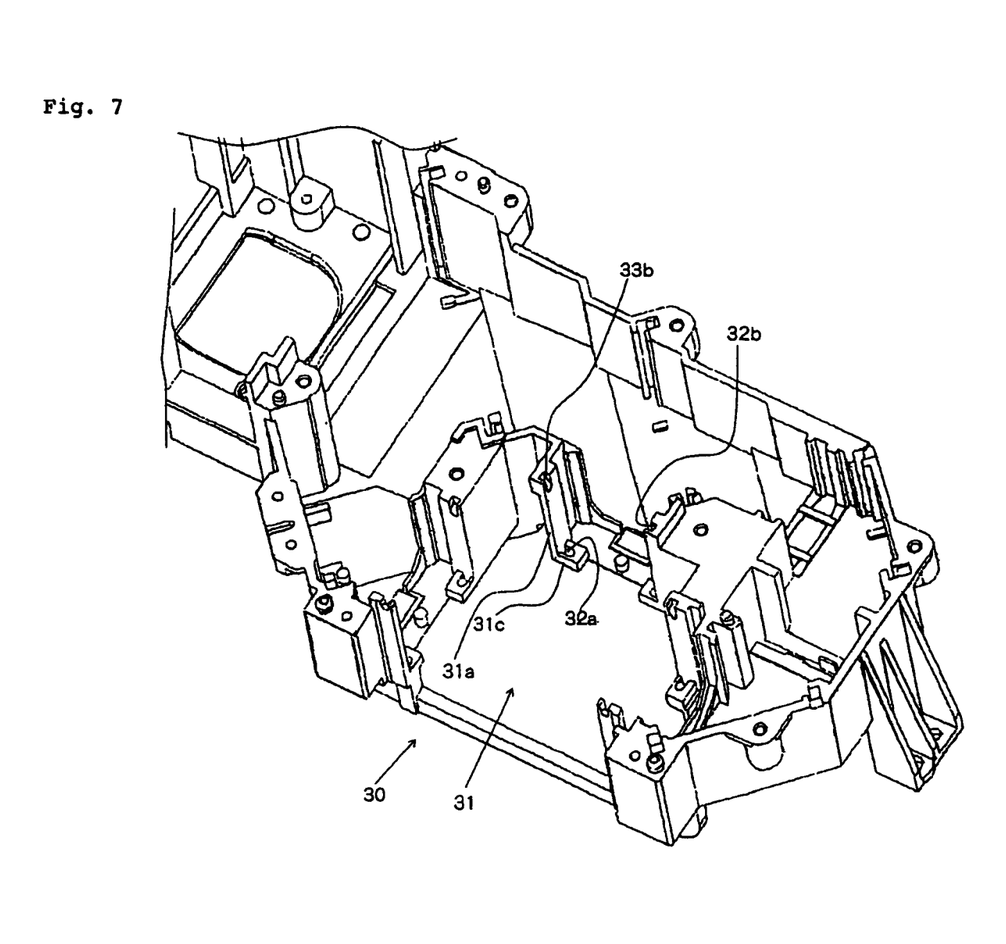
FIG. 7 is a perspective view of an optical engine base, seen from the projection lens side.
Figure 8:
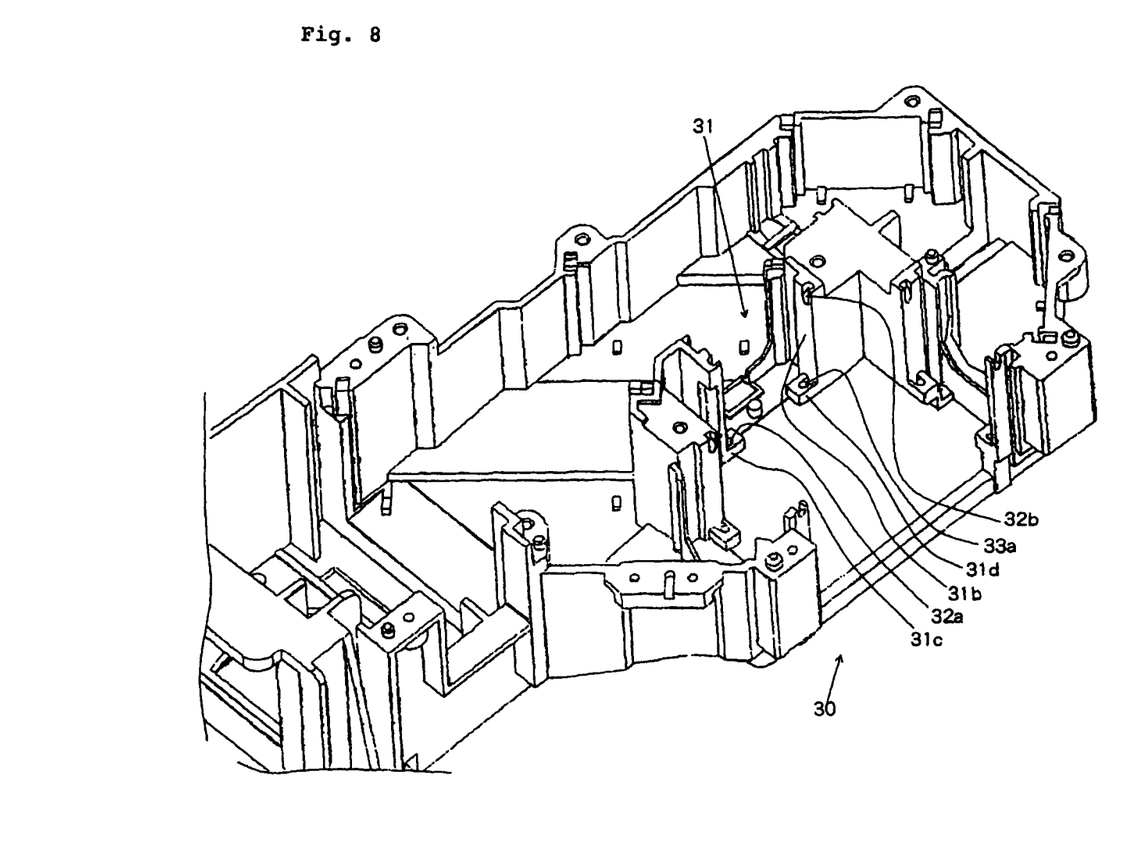
FIG. 8 is a perspective view of FIG. 7, seen from the illumination optical system side.
Figure 9:
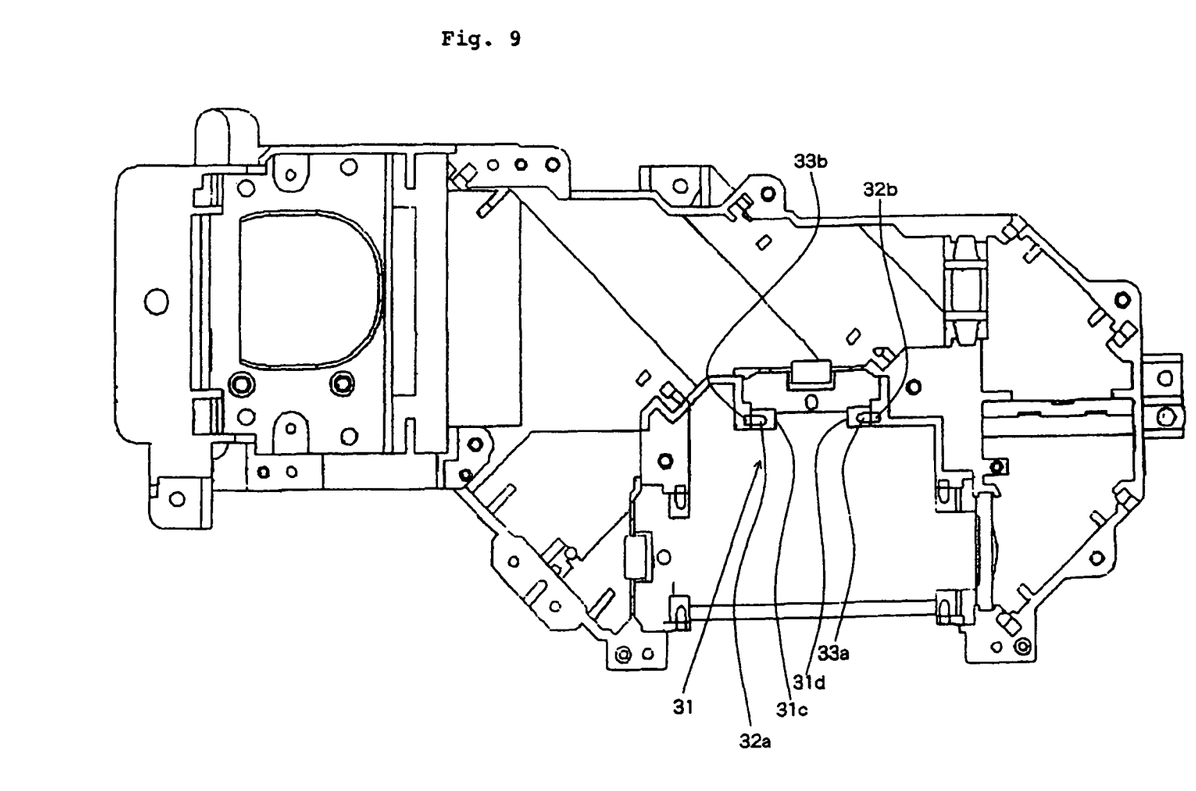
FIG. 9 is a top view of the optical engine base in FIG. 7.

Optical engine base 30, as shown in FIGS. 7 to 9, has a bathtub shape, and is configured so that various optical components are inserted from the upper side thereto. This can improve productivity in assembly.

There is a structure that is designed between optical compensator support 20 on which optical compensator 11 for vertically-aligned-mode of the present exemplary embodiment is mounted and optical engine base 30 so that optical compensator support 20 can be easily assembled into optical engine base 30. The structure will be hereinafter described in detail.

Optical compensator 11 for vertically-aligned-mode is fitted in optical compensator support 20. Optical compensator support 20 is inserted into holder support frame 31 of optical engine base 30 from the upper side. Holder support frame 31 is provided in optical engine base 30 on which optical compensator 11 for vertically-aligned-mode is mounted, and includes an opening for inserting optical compensator support 20. On both sides of the opening, first support member 31*a* and second support member 31*b* are provided. First overhanging member 31*c* overhangs from an end portion of first support member 31*a* opposite to the opening toward second support member 31*b*, and second overhanging member 31*d* overhangs from an end portion of second support member 31*b* opposite to the opening toward first support member 31*a*.

In such holder support frame 31 of optical engine base 30, as shown in FIGS. 7 to 9, in the vicinity of first overhanging member 31*c* of first support member 31*a*, insertion groove 32*a* having a U-shape with which first rotary salient 22 can rotatably engage is provided. Further, in the vicinity of the opening of second support member 31*b*, second insertion groove 32*b* having a U-shape with which second rotary salient 23 can rotatably engage and whose upper side is open is provided.

Further, in holder support frame 31 of optical engine base 30, third insertion groove 33*a* and fourth insertion groove 33*b* having a U-shape are provided at positions symmetrical to first insertion groove 32*a* and second insertion groove 32*b*.

Figure 3:
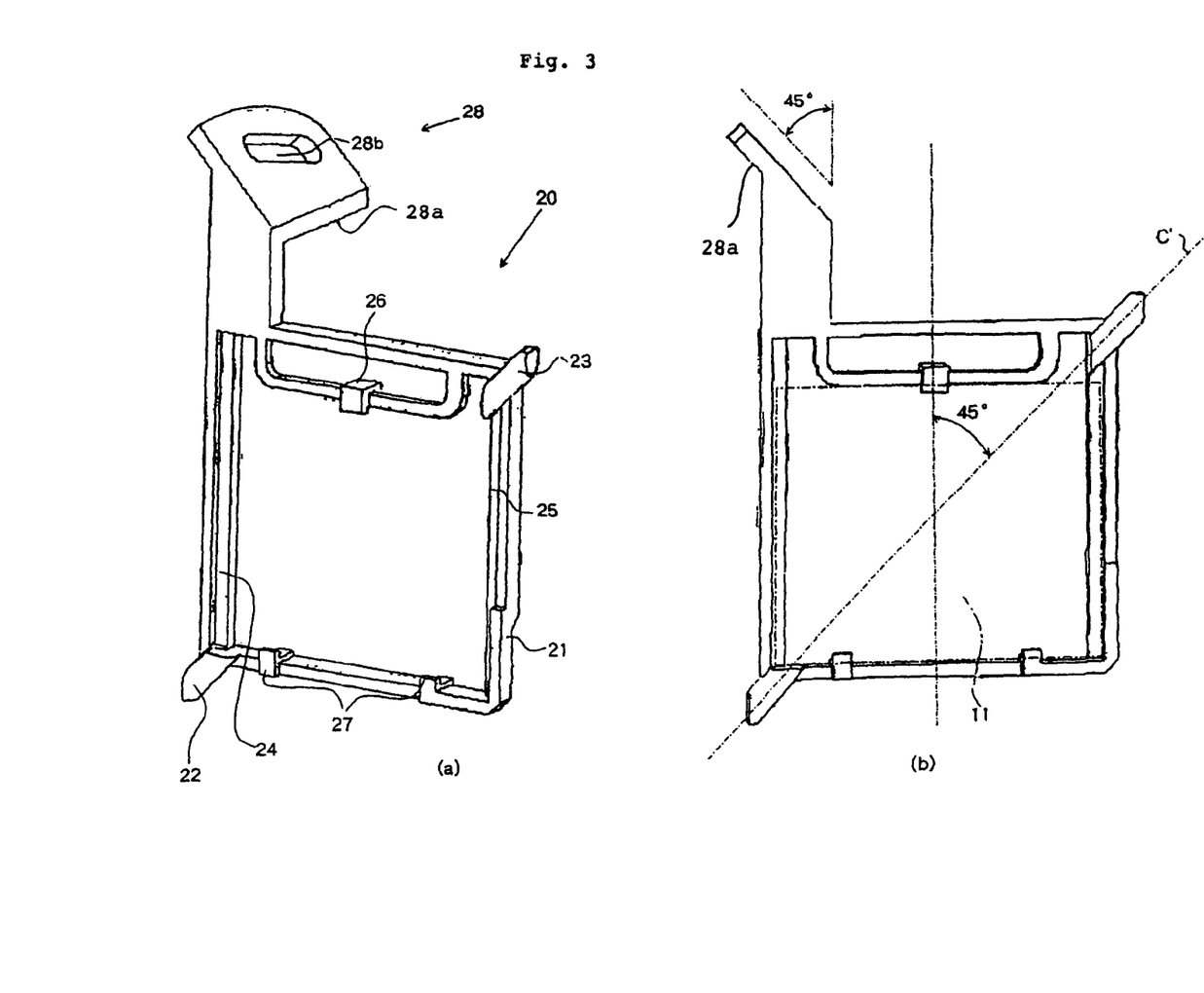
FIGS. 3(a), 3(b) describe an optical compensator support in an exemplary embodiment of the present invention, FIG. 3(a) being a schematic, perspective view of the optical compensator support, and FIG. 3(b) being an elevation view of the optical compensator support.

As shown in FIG. 9, first insertion groove 32*a*, second insertion groove 32*b*, third insertion groove 33*a* and fourth insertion groove 33*b* are formed so that both grooves having a U-shape can be clearly seen, such that optical engine base 30 can be seen from the upper side. When optical compensator support 20 is inserted into holder support frame 31 of optical engine base 30 from the upper side, first rotary salient 22 and second rotary salient 23 of optical compensator support 20 shown in FIG. 3 are respectively inserted into first insertion groove 32a and second insertion groove 32b to engage with them. At this time, in order to easily insert optical compensator support 20 into optical engine base 30 from the upper side without encountering obstacles, first insertion groove 32a, second insertion groove 32b, third insertion groove 33a and fourth insertion groove 33b are positioned not to overlap with one another, so that they can be seen from the vertically upper side. Another way of expressing this, the four grooves all are adapted to be clearly visible, so that they can be seen from the upper side of optical engine base 30.

First and second rotary salients 22, 23 of optical compensator support 20 inserted into holder support frame 31 can freely rotate in first and second insertion grooves 32a, 32b. According to this structure, optical compensator 11 for vertically-aligned-mode can be adjusted around first and second rotary salients 22, 23 as the axis of rotation that will have the most suitable angle.

This angle adjustment optimizes contrast of a projected image. That is, the contrast is adjusted to be highest. During adjustment, a change in the angle of rotation of optical compensator support 20 cannot ensure the right adjustment of the angle. Therefore, to hold fixing arm 28 of optical compensator support 20 in a predetermined place during adjustment, bracket 40 is provided in optical engine base 30. Hereinafter, this mechanism will be described in detail with reference to FIGS. 10 to 12.

Figure 10:
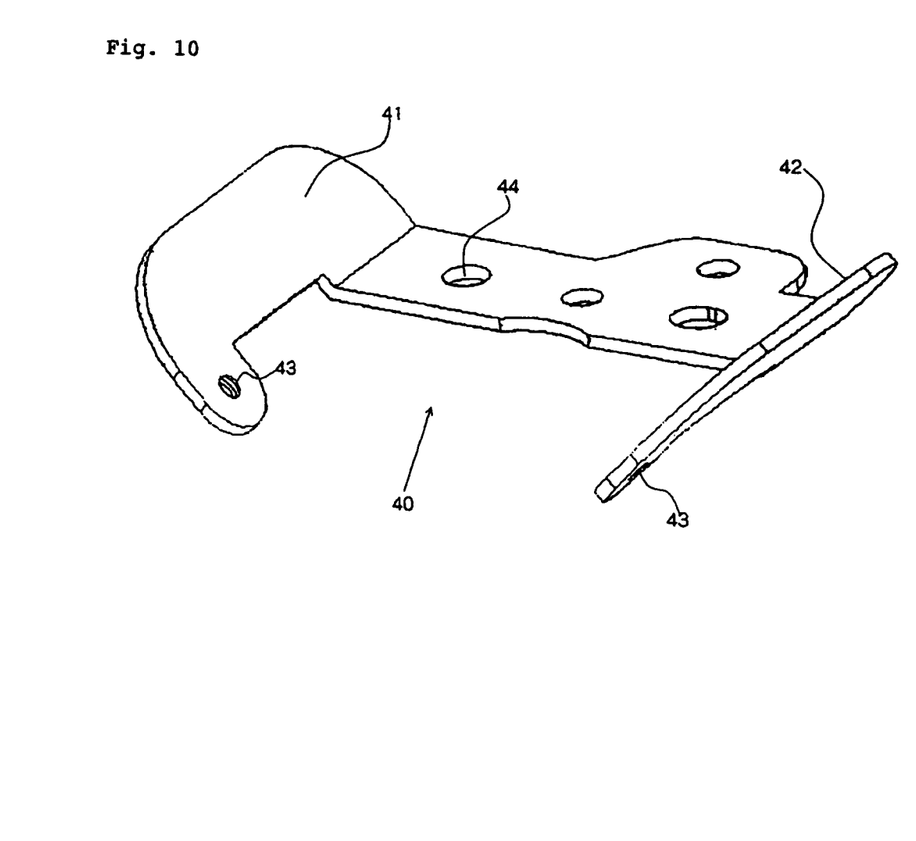
FIG. 10 is a perspective view of a bracket for fixing an optical compensator support to the optical engine base.
Figure 11:
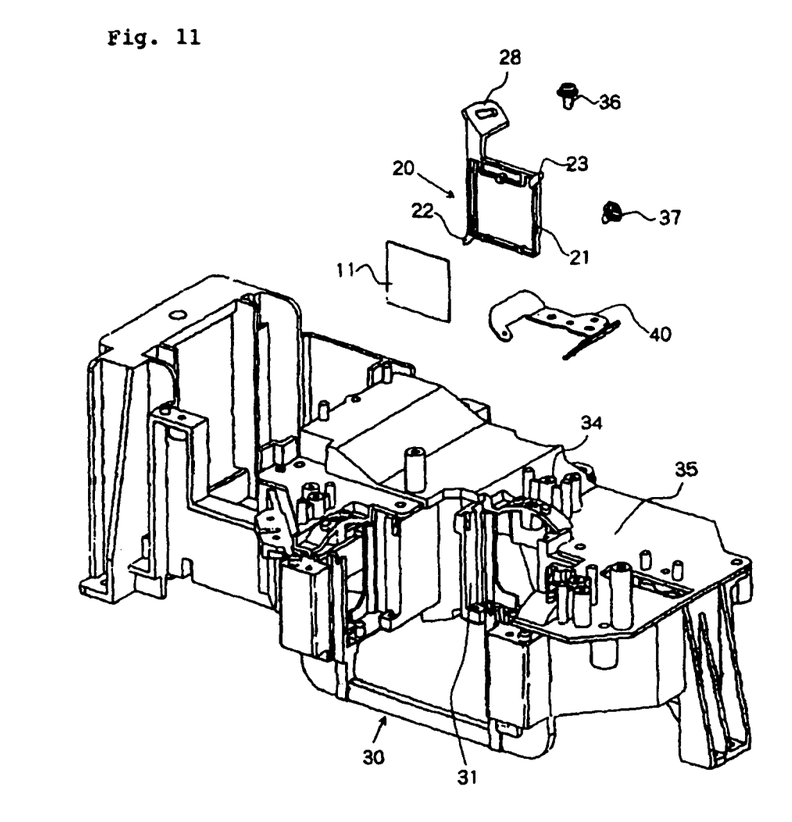
FIG. 11 is a view for describing a method for assembling a holder of an optical compensator for vertically-aligned-mode into the optical engine base in an exemplary embodiment.
Figure 12:
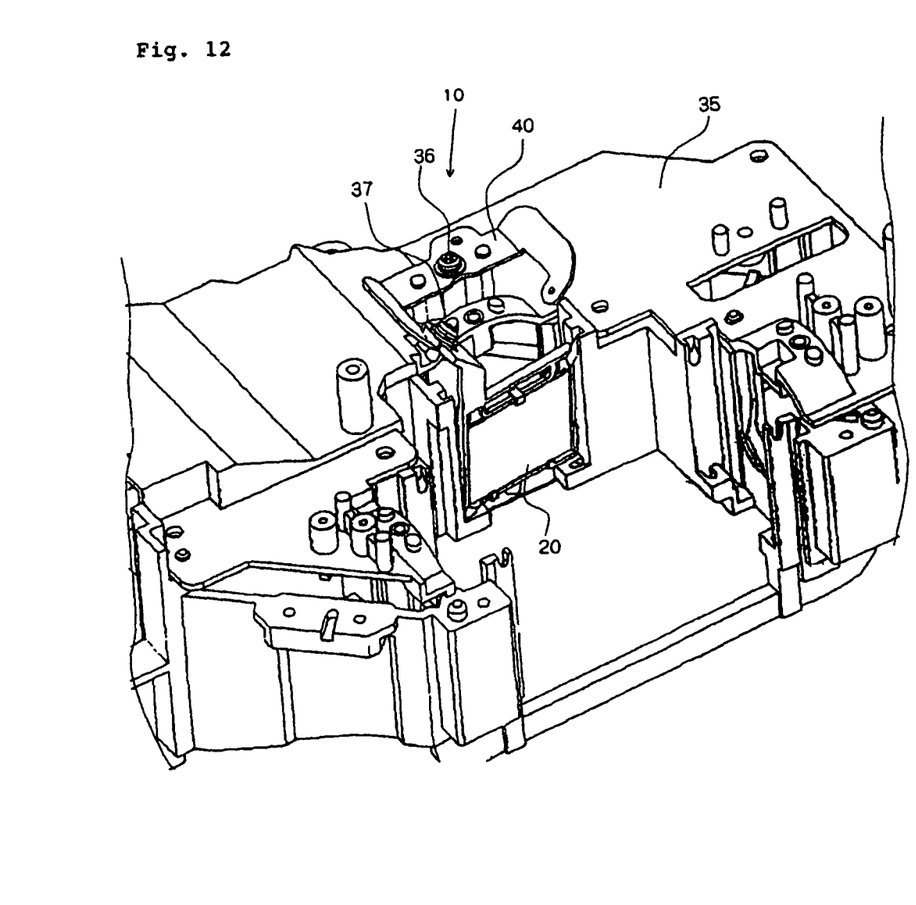
FIG. 12 is a perspective view showing that the holder of an optical compensator for vertically-aligned-mode is assembled into the optical engine base in the exemplary embodiment.

Bracket 40 has fixing hole 44 for attachment to optical engine base 30 as shown in FIG. 10. Then, as shown in FIGS. 11, 12, bracket 40 is fixed to protruding portion 34 provided on upper cover 35 of optical engine base 30, by inserting and screwing setscrew 36 through fixing hole 44.

Sliding surface 28a of optical compensator support 20 inserted into holder support frame 31 is configured to slide along an upper surface of first slipping surface 41 of this bracket 40. That is, while the upper surface of first slipping surface 41 of bracket 40 and sliding surface 28a of optical compensator support 20 are in surface contact with each other, sliding surface 28a of optical compensator support 20 moves, and accordingly, during angle adjustment, the relative angle between them is also kept constant. Therefore, optical compensator support 20 has an axis of rotation kept constant also during the angle adjustment, and thereby the angle of optical compensator support 20 can be accurately adjusted.

After the angle adjustment of optical compensator support 20, setscrew 37 is inserted into elongated hole 28b of fixing arm 28 of optical compensator support 20 and screwed into female screw 43 provided in bracket 40 to fix the position of optical compensator support 20. Setscrew 37 is attached in a direction parallel to optical axis C of optical compensator 11 for vertically-aligned-mode. Female screw 43 has been provided in bracket 40, but it may be provided directly in optical engine base 30.

Depending on the characteristics of a vertically aligned liquid crystal element used, there may be a case where an optical compensator support, that has a mirror revered shape to optical compensator support 20 described up to now, has to be used. Anticipating that contingency, in optical engine base 30, third insertion groove 33a and fourth insertion groove 33b are provided. Also on bracket 40, second slipping surface 42 symmetrical to first slipping surface 41 is provided. Further, female screw 43 that is a receiving portion of setscrew 37 may be provided directly in optical engine base 30 or upper cover 35 as described above, but in the present exemplary embodiment, female screw 43 is provided in bracket 40 that is a separate component.

In order to correspond to the two types of optical compensator support 20 described above, female screw 43 for fixing has to be provided in two directions. Providing female screw 43 directly in optical engine base 30 or upper cover 35 may cause a mold structure for making a cast of optical engine base 30 or upper cover 35 to be complex. Further, the complex mold structure increases a cost for manufacturing the mold. Therefore, the receiving portion of setscrew 37 is desirably provided in bracket 40 that is a separate component if possible.

In such a manner, in bracket 40, first slipping surface 41 in contact with sliding surface 28a of optical compensator support 20 and second slipping surface 42 symmetrical to first slipping surface 41 are provided. In each of first slipping surface 41 and second slipping surface 42, female screw 43 is provided. Therefore, optical compensator support 20 is fixed at the most suitable position after adjustment to bracket 40, by using female screw 43 of the corresponding slipping surface and setscrew 37. Accordingly, optical compensator 11, after the two types of adjustment, can be fixed at the most suitable position by using a simple structure. As described above, bracket 40 is prepared as a separate component from optical engine base 30 and upper cover 35, and thereby an optical component adjustment mechanism that is also effective for a decrease in manufacturing cost can be provided.

Next, another exemplary embodiments to solve the problems of the background art will be illustrated.

One aspect of an optical component adjustment mechanism of the present invention is an optical component adjustment mechanism for rotatably supporting an optical component around a predetermined axis, the optical component adjustment mechanism including an optical component holder, a holder support frame and a fixing member for fixing rotation of the optical component holder. The optical component holder includes a support frame for holding the optical component, and first and second rotary salients projecting outside from the support frame thereof in a predetermined axis. The holder support frame rotatably holds the first and second rotary salients. The predetermined axis of the optical component adjustment mechanism may be provided in a diagonal line of the support frame of the optical component holder.

The holder support frame includes a support member having an opening for inserting the optical component holder. In the support member, an insertion groove with which the first and second rotary salients inserted into the opening are rotatably engaged may be provided. Further, this holder support frame has a first support member and a second support member on both sides of the opening, and includes a first overhanging member overhanging from an end portion of the first support member on the side opposite to the opening facing the second support member, and a second overhanging member overhanging from an end portion of the second support member on the side opposite to the opening facing the first support member. Then, in the vicinity of the first overhanging member of the first support member, a first insertion groove with which the first rotary salient can rotatably engage may be provided, and in the vicinity of the opening of the second support member, a second insertion groove with which the second rotary salient can rotatably engage and whose upper side is open may be provided.

Further, in the vicinity of the second overhanging member of the second support member of the holder support frame, a third insertion groove with which the first rotary salient can rotatably engage may be provided, and in the vicinity of the opening of the first support member, a fourth insertion groove with which the second rotary salient can rotatably engage and of which upper side is open may be provided. The holder support frame may be provided in the optical engine base on which the optical compensator for vertically-aligned-mode is mounted.

The fixing member may include a fixing arm, a bracket, a female screw portion for fixing and a setscrew. The fixing arm is provide in the support frame, and has a sliding surface and an elongated hole provided in the sliding surface. The bracket is provided in the optical engine base on which the optical compensator for vertically-aligned-mode is mounted, and has a slipping surface. The female screw portion for fixing is provided in the optical engine base.

The fixing arm may be provided in one of the corners that is furthest away from the predetermined axis of the support frame, extends outside the support frame, and has a sliding surface on which an extended surface is provided perpendicular to a predetermined axis on the end portion, and an elongated hole provided in the sliding surface along a circular arc centered on the predetermined axis. The bracket may have a slipping surface with which the sliding surface of the fixing arm can slidably engage. The setscrew may be inserted into the elongated hole to fix the fixing arm to the female screw portion for fixing. The female screw portion for fixing may be provided in the bracket and may be fixed to the optical engine base through the bracket.

One aspect of a liquid crystal display of the present invention is characterized by including a liquid crystal panel in a vertically-aligned-mode, a polarizing plate on the incident side, and the optical component adjustment mechanism provided between the liquid crystal panel in a vertically-aligned-mode and the polarizing plate on the incident side.

One aspect of a projection display of the present invention is characterized by including an illumination optical system having a lamp, a liquid crystal display for displaying an image by receiving a light flux emitted by the illumination optical system, and a projection optical system for projecting an image on a projection surface, and having the optical component adjustment mechanism described above between a vertically aligned liquid crystal panel and a polarizing plate on the incident side of the liquid crystal display. Further, it may have three liquid crystal displays for blue, green and red.

In the optical component adjustment mechanism described above, in the vicinity of the intersection point of a diagonal line passing through the center of the optical component holder for holding the optical compensator for vertically-aligned-mode and the support frame, the first rotary salient and the second rotary salient that can rotate around the diagonal line as the central axis are provided. Then, in the support member and the overhanging member of the holder support frame provided in the optical engine base, the lower insertion groove and the upper insertion groove that are rotatably engaged with both rotary salients are provided. Therefore, the optical component holder can engage with the holder support frame from the open side of the insertion groove of the holder support frame, and rotate around a straight line connecting between the first rotary salient and the second rotary salient after engagement.

On the one hand, in an engaged state of the optical component holder and the holder support frame, at a position corresponding to the sliding surface of the fixing arm provided in the optical component holder, a bracket having the slipping surface that can slidably fit the sliding surface provided in the optical engine base is situated. Therefore, slidable fitting of the sliding surface and the slipping surface allows for adjustment of the optical component holder to be positioned at a predetermined position, by rotating the optical component holder around the straight line connecting between the first rotary salient and the second rotary salient. After adjusting the angle of rotation of the optical compensator, the setscrew can be inserted into the elongated hole of the fixing arm and screwed into the female screw portion for attachment to the optical engine base side to fix the fixing arm to the optical engine base. In such a manner, the optical compensator for vertically-aligned-mode can be adjusted to the most suitable tilt against the incident surface of the vertically aligned liquid crystal element, and held and fixed in such a state.

While preferred exemplary embodiments of the present invention have been described using specific terms, such description is for illustrative purposes only, and it is to be understood that changes and variations may be made without departing from the spirit or scope of the following claims.

The invention claimed is:

1. An optical component adjustment mechanism for rotatably supporting an optical component around a predetermined axis, said optical component adjustment mechanism comprising:
an optical component holder including a support frame to support the optical component, and first and second rotary salients projecting outside from the support frame in the predetermined axis;
a holder support frame for rotatably supporting the first and second rotary salients; and
a fixing member for fixing a position of a rotation of the optical component holder,
wherein the holder support frame includes:
an opening for inserting the optical component holder;
first and second support members provided on both sides of the opening;
a first overhanging member overhanging from an end portion of the first support member on a side opposite to the opening the second support member; and
a second overhanging member overhanging from an end portion of the second support member on the side opposite to the opening toward the first support member,
wherein, in a vicinity of the first overhanging member of the first support member, a first insertion groove with which the first rotary salient is arranged to rotatably engage is provided, and
wherein, in a vicinity of the opening of the second support member, a second insertion groove with which the second rotary salient is arranged to rotatably engage and whose an upper side is open is provided.

2. The optical component adjustment mechanism according to claim 1, wherein the predetermined axis is provided in a diagonal line of the support frame of the optical component holder.

3. The optical component adjustment mechanism according to claim 1, wherein in the holder support frame, an opening for inserting the optical component holder, and a support member in which an insertion groove that rotatably engages with the inserted first and second rotary salients is formed are provided.

4. The optical component adjustment mechanism according to claim 1, wherein, in a vicinity of the second overhanging member of the second support member of the holder support frame, a third insertion groove with which the first rotary salient is arranged to rotatably engage is provided, and in a vicinity of the opening of the first support member, a fourth insertion groove with which the second rotary salient is arranged to rotatably engage and whose upper side is open is provided.

5. An optical component adjustment mechanism for rotatably supporting an optical component around a predetermined axis, said optical component adjustment mechanism comprising:
   an optical component holder including a support frame to support the optical component, and first and second rotary salients projecting outside from the support frame in the predetermined axis;
   a holder support frame for rotatably supporting the first and second rotary salients: and
   a fixing member for fixing a position of a rotation of the optical component holder,
   wherein, in the holder support frame, an opening for inserting the optical component holder, and a support member in which an insertion groove that rotatably engages with the inserted first and second rotary salients is formed are provided, and
   wherein the holder support frame is provided in an optical engine base on which the optical component is mounted.

6. An optical component adjustment mechanism for rotatably supporting an optical component around a predetermined axis, said optical component adjustment mechanism comprising:
   an optical component holder including a support frame to support the optical component, and first and second rotary salients projecting outside from the support frame in the predetermined axis;
   a holder support frame for rotatably supporting the first and second rotary salients; and
   a fixing member for fixing a position of a rotation of the optical component holder,
   wherein the fixing member includes:
      an arm provided in the support frame, comprising a sliding surface and an elongated hole provided in the sliding surface;
      a bracket provided in an optical engine base on which the optical component is mounted, comprising a slipping surface;
      a female screw portion provided in the optical engine base; and
      a setscrew that is screwed into said female screw in order to fix the optical component holder.

7. The optical component adjustment mechanism according to claim 6, wherein the arm includes:
   a sliding surface provided in one of the corners that is furthest away from the predetermined axis of the support frame, extending outside the support frame, whose extended surface is provided on the end portion to intersect at right angles with the predetermined axis; and
   an elongated hole provided along a circular arc centered on the predetermined axis in the sliding surface,
   wherein the bracket comprises a slipping surface that is arranged to slidably engage with the sliding surface of the arm, and the setscrew is inserted into the elongated hole to fix the arm to the female screw portion.

8. The optical component adjustment mechanism according to claim 6, wherein the female screw portion is provided in the bracket, and fixed to the optical engine base through the bracket.

9. A liquid crystal display, comprising:
   a liquid crystal panel in a vertically-aligned-mode;
   a polarizing plate on an incident side; and
   the optical component adjustment mechanism according to claim 1 provided between the liquid crystal panel in a vertically-aligned-mode and the polarizing plate on the incident side.

10. A projection display, comprising:
   an illumination optical system comprising a lamp;
   a liquid crystal display for displaying an image by receiving a light flux emitted from the illumination optical system;
   a projection optical system for projecting an image on a projection surface, ;and
   the optical component adjustment mechanism according to claim 1 provided between the liquid crystal panel in a vertically-aligned-mode and the polarizing plate on an incident side of the liquid crystal display.

11. The projection display according to claim 10, comprising:
   three of ones of the liquid crystal display for blue, green, and red.

12. The optical component adjustment mechanism according to claim 1, wherein the holder support frame is provided in an optical engine base on which the optical component is mounted.

13. The optical component adjustment mechanism according to claim 4, wherein the holder support frame is provided in an optical engine base on which the optical component is mounted.

14. The optical component adjustment mechanism according to claim 2, wherein the fixing member includes:
   an arm provided in the support frame, comprising a sliding surface and an elongated hole provided in the sliding surface;
   a bracket provided in an optical engine base on which the optical component is mounted, comprising a slipping surface;
   a female screw portion provided in the optical engine base; and
   a setscrew that is screwed into said female screw in order to fix the optical component holder.

15. A liquid crystal display, comprising:
   a liquid crystal panel in a vertically-aligned-mode;
   a polarizing plate on an incident side; and
   the optical component adjustment mechanism according to claim 2 provided between the liquid crystal panel in a vertically-aligned-mode and the polarizing plate on the incident side.

16. A liquid crystal display, comprising:
   a liquid crystal panel in a vertically-aligned-mode;
   a polarizing plate on an incident side; and
   the optical component adjustment mechanism according to claim 3 provided between the liquid crystal panel in a vertically-aligned-mode and the polarizing plate on the incident side.

17. A liquid crystal display, comprising:
   a liquid crystal panel in a vertically-aligned-mode;
   a polarizing plate on an incident side; and
   the optical component adjustment mechanism according to claim 1 provided between the liquid crystal panel in a vertically-aligned-mode and the polarizing plate on the incident side.

18. A liquid crystal display, comprising:
   a liquid crystal panel in a vertically-aligned-mode;
   a polarizing plate on an incident side; and
   the optical component adjustment mechanism according to claim 4 provided between the liquid crystal panel in a vertically-aligned-mode and the polarizing plate on the incident side.

19. A liquid crystal display, comprising:
a liquid crystal panel in a vertically-aligned-mode;
a polarizing plate on an incident side; and
the optical component adjustment mechanism according to claim 5 provided between the liquid crystal panel in a vertically-aligned-mode and the polarizing plate on the incident side.

\* \* \* \* \*